March 15, 1938.    O. C. LINTHWAITE    2,111,324
INTERNAL COMBUSTION ENGINE
Filed May 27, 1935    2 Sheets-Sheet 1
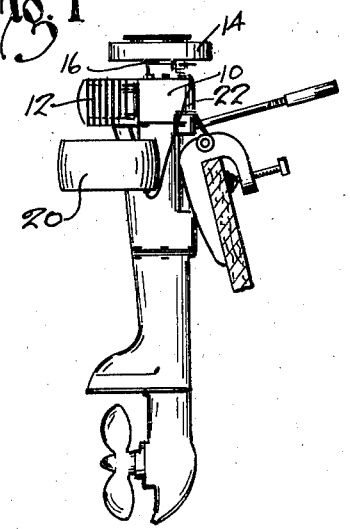
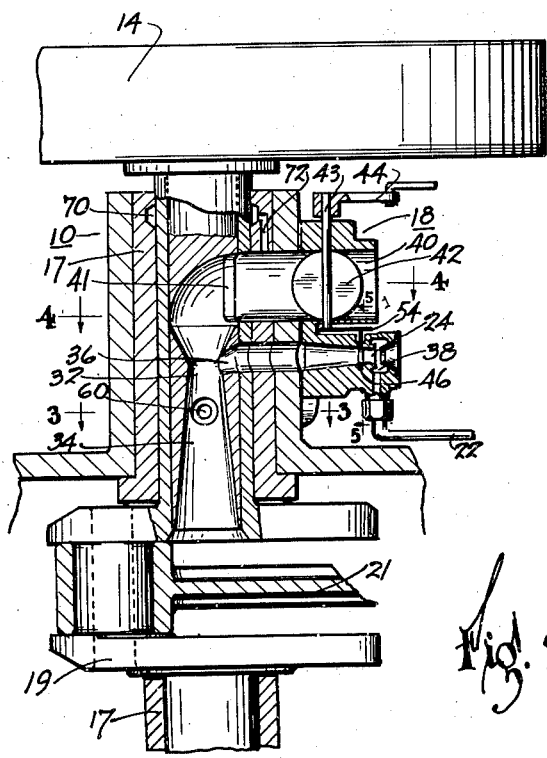
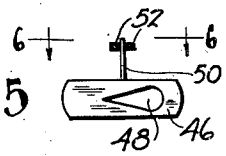
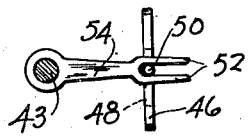
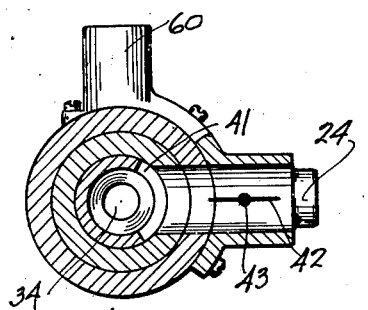
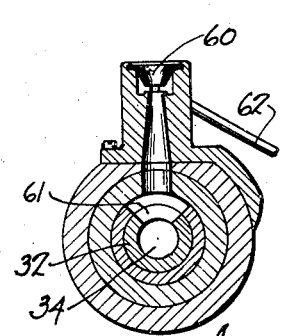
INVENTOR.
OWEN C. LINTHWAITE
BY *P. E. Wilson*
ATTORNEY.

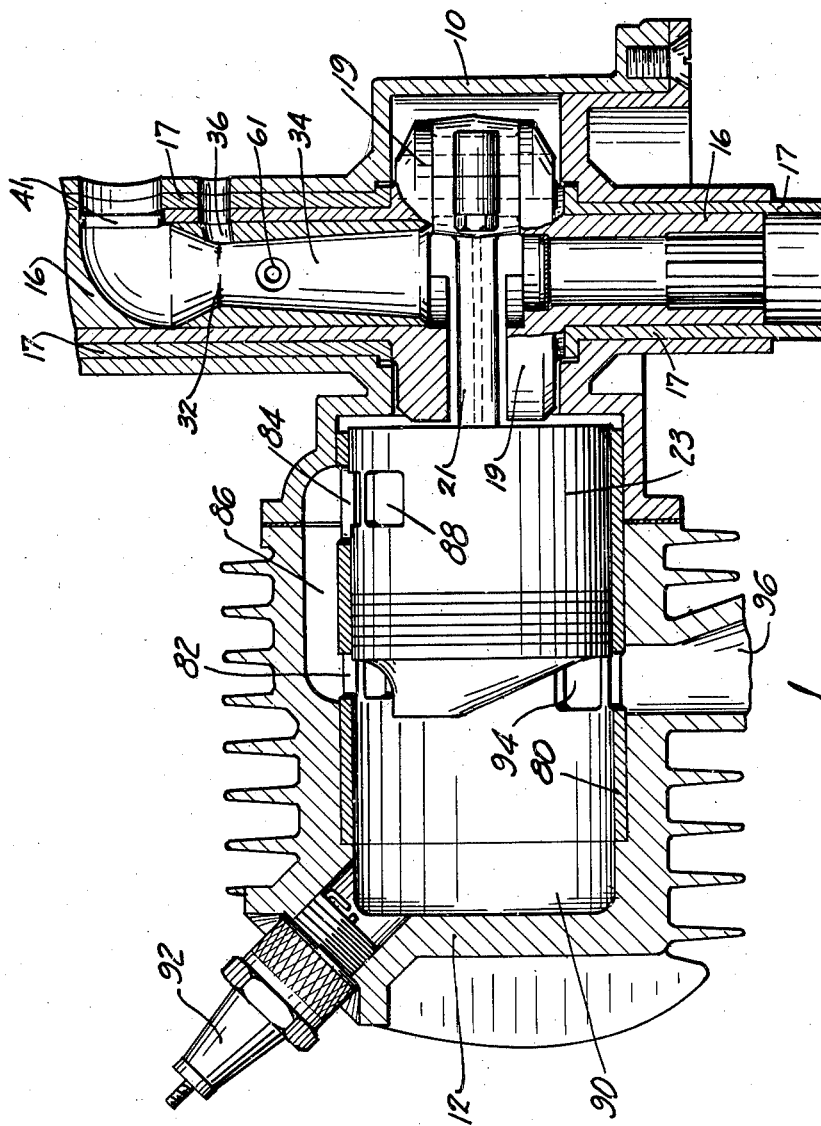

Patented Mar. 15, 1938

2,111,324

UNITED STATES PATENT OFFICE 2,111,324

INTERNAL COMBUSTION ENGINE

Owen C. Linthwaite, South Bend, Ind., assignor to Bendix Products Corporation, South Bend, Ind., a corporation of Indiana Application May 27, 1935, Serial No. 23,576

11 Claims. (Cl. 123—73)

This invention relates to engines, and more particularly to an engine having a carburetor built into the crankshaft thereof.

The invention is particularly applicable to engines operating on the two cycle stroke principle wherein the crankcase of the engine is employed as a chamber for the compression of a combustible mixture, and ports are provided interconnecting the crankcase with the combustion chamber of the cylinder above the piston. In this type of engine a cylinder liner having ports, is utilized to bypass the combustible charge from the crankcase to the combustion chambers upon movement of the piston reciprocating within the cylinder to alternately open and close ports projecting through the cylinder liner.

An object of this invention is to provide an internal combustion engine having a carbureting device built into the crankshaft, to obviate many of the operating difficulties encountered where the carburetor is fixed to the outer surface of the engine.

A further object of the invention is to provide an engine having an in-built carburetor with the minimum number of moving parts, and operable to supply the most satisfactory combustible mixture to the engine.

Another object of the invention is to provide a fuel lifting carburetor wherein a rich mixture of fuel and air is supplied by a fuel lifting venturi and the rich mixture is diluted with air admitted through an air inlet passage to supply the engine with a suitable charge of combustible mixture for the normal operation of the engine.

A still further object is to provide a fuel lift carburetor wherein a charge of combustible mixture for idling purposes is supplied to a fuel lift venturi when the supply of combustible mixture for the normal operation of the engine has been entirely closed.

Another object of the invention is to provide a carburetor wherein the induction passage or mixing chamber of the carburetor is disposed within the crankshaft of the engine, and a combustible mixture for normal and idling operation is supplied to the induction passage through ports extending through the side walls of the crankshaft housing, and cooperating with spaced ports positioned in the crankshaft to supply the combustible mixture to the induction passage at proper intervals determined in accordance with the rotation of the crankshaft.

A still further object of this invention is to provide a choke valve for the air inlet passage and a novel control valve for a fuel lift venturi operable to supply a rich mixture of fuel and air to an induction passage positioned within the crankshaft of the engine.

Other objects and advantages of this invention will appear from the following detailed description considered in connection with the accompanying drawings, submitted for purposes of illustration only, and not intended to define the scope of the invention, reference being had for that purpose to the subjoined claims.

In the drawings, wherein similar reference characters refer to similar parts throughout the several views:

Figure 1 is a view in elevation of an outboard motor equipped with a device incorporating the features of the present invention;

Figure 2 is a vertical section through a portion of the engine of Figure 1 showing the crankshaft and the carbureting device;

Figure 3 is a view taken on the line 3—3 of Figure 2;

Figure 4 is a view taken on the line 4—4 of Figure 2;

Figure 5 is a view taken on the line 5—5 of Figure 2;

Figure 6 is a view taken on the line 6—6 of Figure 5; and

Figure 7 is a sectional view of an engine embodying the invention.

Referring more particularly to Figure 1, there is shown an outboard motor having a crankcase 10 fitted with a cylinder 12. A flywheel 14, fixed to a hollow crankshaft 16 projecting through the crankcase 10, operates to render the rotative motion of the hollow crankshaft 16 uniform. The crankshaft 16 rotates in bearings 17, engaging the upper and lower sections thereof, beyond an offset crank 19. A piston rod 21 engages the crank 19 and interconnects the crankshaft 16 with a piston 23 reciprocable in the cylinder 12.

A carbureting device, indicated generally at 18, is fixed to the crankcase 10. Fuel is supplied to the carburetor 18 from a fuel reservoir 20, positioned beneath the cylinder 12 of the engine, through a fuel duct 22 communicating with a primary fuel lifting venturi 24 of the carburetor 18.

The upper portion of the crankshaft 16 is hollow, and is fitted with a secondary venturi 32 to form a mixing chamber or induction passage 34. A port 36, extending through the side walls of the secondary venturi 32 operates to admit a rich mixture of fuel and air drawn through the fuel duct 22 communicating at the most restricted section 38 of the primary venturi 24, as air is drawn through the primary venturi 24 responsive to suction exerted within the crankcase 10 of the engine.

The rich mixture of fuel and air supplied to the induction passage 34 by the primary venturi is too rich to support combustion in the cylinder 12. An air inlet passage 40, communicating with the induction passage 34 by way of a port 41, is therefore provided to supply a quantity of air to the induction passage to dilute the rich mixture to form a suitable charge of combustible mixture for the normal operation of the engine.

The primary venturi 24 communicates with the induction passage 34 at the most restricted section of the secondary venturi 32. A high suction is therefore exerted upon the primary venturi to supply suitable combustible mixture for the operation of the engine.

The air inlet passage 40 is controlled by a butterfly valve 42, positioned therein and manually controlled by means of a lever 44 to vary the amount of air admitted to the induction passage 34.

Means are provided to control the effective opening of the primary venturi 24 by means of a slide valve 46 having a tapered slot 48 therein to vary the effective size of the passageway through the primary venturi, as the slide 46 is moved longitudinally across the venturi. The slide valve 46 is provided with a stem 50, extending laterally therefrom, adapted to be engaged by the bifurcated end 52 of a lever 54 fixed to the choke shaft 43. It is therefore possible to accurately control the quantity of air admitted through the air inlet passage 40, and the amount of fuel mixture supplied by the primary venturi 24, by merely manipulating the lever 44.

Fuel for idling purposes is supplied through an auxiliary fuel lifting venturi 60 communicating with the induction passage 34 by way of a port 61 extending through the side walls of the secondary venturi 32. For purposes of illustration, and to avoid crowding the drawing, this port is shown communicating with the induction passage 34 at an angle of 90° from the primary venturi 24. It is to be understood, however, that the idling venturi and the primary venturi may both communicate with the induction passage at the same angle. The idling venturi 60 may communicate at a lower point than the primary venturi 24 to avoid the high suction exerted at the throat of the secondary venturi 32 during normal operation of the engine. Fuel is supplied to the idling venturi 60 through a fuel duct 62 communicating with the fuel reservoir 20 and terminating at the most restricted section of the venturi 60.

When the butterfly valve 42 and the slide valve 46 are in the open position, the engine is supplied with a combustible mixture by the primary venturi 24 and the air inlet passage 40. At such times, no suction is exerted upon the idling venturi 60 and it is completely inoperative. At such times as the choke valve 42 and the slide valve 46 are closed, the suction of the engine is exerted upon the idling venturi 60. A suitable quantity of combustible mixture will then be supplied by the idling venturi 60 to operate the engine at normal idling speed.

The primary venturi 24; the air inlet passage 40, and the idling venturi 60, extending through the crankcase 10, are provided with spaced ports designed to coact with spaced ports extending through the walls of the secondary venturi 32 to admit a suitable charge to keep the engine operating at various speeds, that is the area of the ports and the circumferential angular travel are calibrated so as to supply a suitable charge at various operating speeds of the engine.

The cylinder 12 is preferably provided with a liner 80, having outer and inner inlet ports 82 and 84 respectively formed therein. The ports 82 and 84 are interconnected by a bypass port 86 extending longitudinally with reference to the cylinder 12. The piston 23 is provided with ports 88 positioned in such a manner as to interconnect the interior of the crankcase 10 with a combustion chamber 90 formed in the outer end of the cylinder 12 when the piston 23 is in the retracted position as illustrated in Figure 7. It will be observed that in the position shown, the compressed combustible mixture may flow through the aligned ports 88 and 84, through the bypass port 86, through the outer ports 82, and over the top of the piston 23, into the combustion chamber 90. As the crankshaft 16 rotates, the piston 23 moves outwardly in the cylinder 12, whereupon communication between the ports 88 and 84 is interrupted and the outer ports 82 are closed by the piston 23. The combustible mixture is then compressed as the piston 23 moves outwardly in the cylinder 12. As the piston approaches the fully extended position, the charge is ignited by means of a spark plug 92, and the piston is forced inwardly in the cylinder 12. When the piston has moved inwardly a predetermined distance, exhaust ports 94 formed in the liner 80 are uncovered and the products of combustion may be discharged through the exhaust outlet 96 to the atmosphere.

The operation of this device is as follows: Assume that the engine is cold and it is desired to start the engine. The choke valve 42 is moved to the fully closed position. The slide valve 46 engaged by the bifurcated end 52 of the lever 54, is moved to the fully opened position. The engine is then cranked, a high suction being exerted in the induction passage 34, to draw a quantity of air and fuel through the primary venturi 24, and the idling venturi 60. As soon as the engine has started, the choke valve is moved to the slightly opened position to admit a supply of air through the air inlet passage 40, to dilute the rich mixture of fuel and air formed in the primary venturi 24, to supply the engine with a suitable charge of combustible mixture.

The valve 42, and the slide valve 46, then move in unison to supply the engine with a suitable charge for operating the engine at all speeds above idling. The suction exerted upon the inner end of the idling venturi 60 decreases very rapidly upon engine starting, and the flow of air and fuel through the idling venturi ceases very shortly after the throttle has been substantially opened.

To idle the engine the lever 44 is moved to nearly close the choke valve 42 and the slide valve 46. A mixture of fuel and air is then supplied through the idling venturi 60 to operate the engine.

Means are provided between the crankshaft 16 and the bearing members 17 to prevent the escape of oil at the upper surface of the bearing members 17. This means includes a circumferential groove 70 extending around the inner surface of the bearing members 17 and communicating by means of a port 72 with the air inlet passage 40. Upon each suction stroke of the engine, suction is transmitted to the groove 70 to withdraw any surplus supply of lubricant contained therein, and to prevent the lubricant from escaping between the crankshaft 16 and the upper end of bearing members 17.

While a preferred embodiment of the invention has been described in detail, it is not intended that the invention shall be limited to the details described, nor otherwise than by the terms of the following claims.

I claim:

1. An engine having a non-rotatable crankcase, a crankshaft rotatable in the crankcase, a carbureting passage positioned in the crankshaft, means including spaced cooperating ports extending through the walls of the crankshaft and crankcase to supply a combustible charge of fuel and air to the crankcase of the engine, and manually operable valve means controlling the quantity and quality of the combustible mixture admitted by the spaced ports.

2. In a two-cycle engine having a non-rotatable crankcase adapted to be subjected to pressure, a cylinder, a crankshaft rotatable in the crankcase, a carbureting passage in the crankshaft communicating with the interior of the crankcase through intermittently aligned spaced ports extending through the walls of the crankcase and crankshaft to supply a combustible charge of fuel and air to the engine, bypass means interconnecting the interior of the crankcase and the cylinder, and manually operable means to control said ports.

3. In an outboard motor having a crankcase, a crankshaft rotatable therein, a carbureting passage including a secondary venturi positioned in the crankcase and communicating with the interior of the crankcase, spaced ports extending through the walls of the crankshaft at and above the restricted section of the secondary venturi, means to supply a mixture of fuel and air to the port communicating with the carbureting passage at the restricted section of the venturi and means to supply a quantity of air to the port communicating with the carbureting passage above the restricted section of the secondary venturi.

4. A two-cycle outboard motor having a crankcase, a crankshaft rotatable therein, a carbureting passage including a secondary venturi positioned in the crankcase and communicating with the interior of the crankcase, spaced ports extending through the walls of the crankshaft at and above the restricted section of the secondary venturi, means to supply a combustible mixture of fuel and air to said ports, and manual means to control the combustible mixture supplied.

5. In an outboard motor having a crankcase, a crankshaft rotatable therein, a carbureting passage including a secondary venturi positioned in the crankcase and communicating with the interior of the crankcase, spaced ports extending through the walls of the crankshaft at and above the restricted section of the secondary venturi, means to supply a mixture of fuel and air to the port communicating with the carbureting passage at the restricted section of the venturi and means to supply a quantity of air to the port communicating with the carbureting passage above the restricted section of the secondary venturi, manually operable means to control the flow of fluid to said ports, and means actuated by variations in fluid pressure within the carbureting passage to supply a decreased quantity of fuel and air when said manually operable means is closed.

6. In a carburetor for an internal combustion engine having a crankcase, a crankshaft rotatable within the crankcase, an induction passage in the crankshaft, an air inlet passage adapted to communicate with the induction passage each time the crankshaft revolves, a primary venturi adapted to communicate with the induction passage each time the crankshaft revolves, a fuel jet communicating with the primary venturi at the restricted section thereof, and means to control the air inlet passage and the primary venturi.

7. In a carburetor for an internal combustion engine having a crankcase, a crankshaft rotatable within the crankcase, an induction passage including a secondary venturi in the crankshaft, an air inlet passage adapted to communicate with the induction passage each time the crankshaft revolves, a primary venturi adapted to communicate with the induction passage each time the crankshaft revolves, a fuel jet communicating with the primary venturi at the restricted section thereof, and means including interconnected manually operable valves to control the air inlet passage and the primary venturi.

8. In a carburetor for a two-cycle internal combustion engine for an outboard motor having a crankcase, a crankshaft rotatable within the crankcase, an induction passage including a secondary venturi in the crankshaft, an air inlet passage adapted to communicate with the induction passage each time the crankshaft revolves, a primary fuel lifting venturi adapted to communicate with the induction passage at the restricted section of the secondary venturi each time the crankshaft revolves, a fuel jet communicating with the primary venturi at the restricted section thereof, means including interconnected manually operable valves to control the air inlet passage and the primary venturi, and an idling venturi communicating with the induction passage beyond the restricted section of the secondary venturi.

9. A fuel lift carburetor for an internal combustion engine having a crankcase, a crankshaft rotatable in the crankcase, a carbureting passage including a secondary venturi in the crankshaft, a fuel lifting venturi adapted to communicate with the carbureting passage each time the crankshaft revolves, an air inlet passage adapted to communicate with the carbureting passage each time the crankshaft revolves, and means including a manually operable butterfly valve controlling the air inlet passage and a slide valve controlling the fuel lifting venturi to control the carburetor.

10. A fuel lift carburetor for an internal combustion engine having a crankcase, a crankshaft rotatable in the crankcase, a carbureting passage including a secondary venturi positioned in the crankshaft, a fuel lifting venturi adapted to communicate with the carbureting passage each time the crankshaft revolves, an air inlet passage adapted to communicate with the carbureting passage each time the crankshaft revolves, and means including a butterfly valve controlling the air inlet passage and a slide valve controlling the fuel lifting venturi to control the carburetor, means including a bifurcated link and a pin interconnecting the butterfly valve and the slide valve to operate said valves in unison, and manual means to actuate the last named means.

11. A fuel lift carburetor for an outboard motor having a crankcase adapted to be subjected to pressure, a crankshaft rotatable in the crankcase, a carbureting passage including a secondary venturi positioned in the crankshaft, a fuel lifting venturi adapted to communicate with the carbureting passage at the restricted section of the secondary venturi each time the crankshaft revolves, an air inlet passage adapted to communicate with the carbureting passage each time the crankshaft revolves, and means including a butterfly valve controlling the air inlet passage and a slide valve controlling the fuel lifting venturi to control the carburetor, means including a bifurcated link fixed to the butterfly valve and a pin fixed to the slide valve interconnecting the butterfly valve and the slide valve to operate said valves in unison, manual means to actuate the last named means, and an idling fuel lifting venturi communicating with the carbureting passage posterior to the restricted section of the secondary venturi to supply fuel and air to the engine when said valves are closed.

OWEN C. LINTHWAITE.